(12) United States Patent
Nair et al.

(10) Patent No.: US 12,498,991 B2
(45) Date of Patent: Dec. 16, 2025

(54) METHODS AND SYSTEMS FOR IDENTIFYING MULTIPLE WORKLOADS IN A HETEROGENEOUS ENVIRONMENT

(71) Applicant: SAMSUNG ELECTRONICS CO., LTD., Suwon-si (KR)

(72) Inventors: Roshan R. Nair, Karnataka (IN); Arun George, Karnataka (IN); Vishak Guddekoppa, Karnataka (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 625 days.

(21) Appl. No.: 17/935,124

(22) Filed: Sep. 25, 2022

(65) Prior Publication Data

US 2024/0028419 A1 Jan. 25, 2024

(30) Foreign Application Priority Data

Jul. 21, 2022 (IN) .............................. 202241041897

(51) Int. Cl.
*G06F 9/50* (2006.01)
*G06F 18/2413* (2023.01)

(52) U.S. Cl.
CPC .......... *G06F 9/5083* (2013.01); *G06F 9/5033* (2013.01); *G06F 18/24133* (2023.01)

(58) Field of Classification Search
CPC .................. G06F 9/5083; G06F 9/5033; G06F 18/24133; G06F 18/253; G06N 20/00
See application file for complete search history.

(56) References Cited

U.S. PATENT DOCUMENTS

| 10,884,636 | B1 | 1/2021 | Abrol et al. | |
| 2014/0047095 | A1* | 2/2014 | Breternitz | G06F 9/5072 709/224 |
| 2015/0379420 | A1* | 12/2015 | Basak | G06F 16/11 706/12 |
| 2016/0078361 | A1* | 3/2016 | Brueckner | H04L 67/10 706/12 |
| 2017/0126795 | A1 | 5/2017 | Kumar et al. | |

(Continued)

FOREIGN PATENT DOCUMENTS

CA 2426439 4/2003

OTHER PUBLICATIONS

Thang Le Duc, et al., "Machine Learning Methods for Reliable Resource Provisioning in Edge-Cloud Computing: a Survey," ACM Computing Surveys, vol. 0. No. 0. Artcle 1, Publication Date Jun. 2019.

(Continued)

*Primary Examiner* — Dong U Kim
(74) *Attorney, Agent, or Firm* — Morgan, Lewis & Bockius LLP

(57) ABSTRACT

A method for identifying a plurality of workloads in a heterogenous environment includes collecting a plurality of parameters from at least one layer of a system stack associated with the plurality of workloads, correlating the collected plurality of parameters from different layers of software stack, and creating a feature set based on the correlated plurality of parameters. The method further includes processing the feature set using a successively ordered classifier chain (SOCC) module to identify the presence of the plurality of workloads in the heterogenous environment in a data center.

13 Claims, 8 Drawing Sheets

(56) References Cited

U.S. PATENT DOCUMENTS

| | | | |
|---|---|---|---|
| 2018/0018339 A1 | 1/2018 | Basak et al. | |
| 2019/0220703 A1 | 7/2019 | Prakash et al. | |
| 2020/0028935 A1 | 1/2020 | Sahay et al. | |
| 2020/0099692 A1 | 3/2020 | Mahindru et al. | |
| 2020/0296182 A1* | 9/2020 | Khosrowpour | H04L 67/303 |
| 2020/0410288 A1* | 12/2020 | Capota | G06F 21/6245 |
| 2021/0037107 A1* | 2/2021 | Klenk | H04L 12/1886 |
| 2021/0224245 A1* | 7/2021 | Sharma | G06N 20/00 |
| 2022/0004320 A1* | 1/2022 | Matosevich | G06F 3/0659 |
| 2023/0074802 A1* | 3/2023 | Comer | G06F 9/5044 |
| 2023/0394352 A1* | 12/2023 | Byrne | G06F 18/2431 |
| 2024/0007414 A1* | 1/2024 | Jain | G06F 9/5088 |

OTHER PUBLICATIONS

PDAWL: Profile-based Iterative Dynamic Adaptive WorkLoad Balance on Heterogeneous Architectures, JSSPP 2020, Job Scheduling Strategies for Parallel Processing pp. 145-162.

Jayanta Basak, Kushal Wadhwani, and Kaladhar Voruganti. 2016. Storage Workload Identification, ACM Transactions on Storage, vol. 12, No. 3, Article 14, Publication date: May 2016, pp. 14.1-14.30.

Bumjoon Seo, Sooyong Kang, Jongmoo Choi, Jaehyuk Cha, Youjip Won, and Sungroh Yoon, IO Workload Characterization Revisited: A Data-Mining Approach, IEEE Transactions on Computers, vol. 63, No. 12. Dec. 2014, pp. 3026-3038.

Keikha, Maryam and Hashemi, Sattar (2016). Ordered Classifier Chains for Multi-label Classification, Journal of Machine Intelligence 1 (1): 7-12, 2016 | https://Isp.institute.

NetApp Solutions, Mar. 11, 2022, pp. 1-883.

Office Action dated May 6, 2025 issued in corresponding Indian Patent Application No. 202241041897.

Bu et al., "Rapid Deployment of Anomaly Detection Models for Large Number of Emerging KPI Streams," Publication Date: Dec. 31, 2018.

Alguliyev et al., "Hybridisation of classifiers for anomaly detection in big data," Publication Date: Dec. 31, 2019: pp. 11-19.

Pham et al., "Recurrent Neural Network for Classifying of HPC Applications," Publication: Dec. 31, 2019.

\* cited by examiner

| Avg Write Latency | Std. Dev Read Latency | Std. Dev Write Latency | Avg Read Segment size | Avg Write Segment size | Perc. Of Read break points |
|---|---|---|---|---|---|
| Perc. Of Write break points | Perc. Of Read continuous points | Perc. Of Write continuous points | Read cp2bp | Write cp2bp | Perc. of read I/Os with 8 sectors |
| Perc. of read I/Os with 16 sectors | Perc. of read I/Os with 64 sectors | Perc. of write I/Os with > 64 sectors | Perc. of write I/Os with 8 sectors or less | Perc. of write I/Os with 16 sectors or less | Perc. of write I/Os with 64 sectors or less |
| Perc. of write I/Os with > 64 sectors | Perc. Of rewrites | Perc. Of Read copy updates | Wiseness factor of the workload | Avg Read throughput | Avg Write throughput |

FIG. 6

METHODS AND SYSTEMS FOR IDENTIFYING MULTIPLE WORKLOADS IN A HETEROGENEOUS ENVIRONMENT

CROSS REFERENCE TO RELATED APPLICATION

This U.S. non-provisional patent application claims priority under 35 U.S.C. § 119 from Indian Patent Application No. 202241041897 filed on Jul. 21, 2022 in India, the contents of which are herein incorporated by reference in their entirety.

TECHNICAL FIELD

Embodiments of the present disclosure are directed to the field of heterogenous environments and more particularly to identifying multiple workloads in a heterogeneous environment.

DISCUSSION OF THE RELATED ART

A heterogenous environment/data centre (DC) environment is subjected to different kinds of workloads or application scenarios. In addition, the multiple workloads can be present at the same time in multi tenancy scenarios. Different workloads pose different challenges to the datacenter software, and their demand for resources also might be different. The data center software should tune itself differently to accommodate different workload scenarios. So, identifying the ongoing workloads may the data center software in preparing its resources and use the resources more efficiently. However, existing methods of workload identification are lacking in some aspects. For example, most existing methods focus on identifying a single workload at a time and do not include methods for identifying multiple workloads at a same time in the heterogenous environment.

SUMMARY

Embodiments herein provide methods and systems for identifying a plurality of workloads in a heterogenous environment. A method includes collecting a plurality of parameters from at least one layer of a system stack associated with the plurality of workloads, correlating the collected plurality of parameters, creating a feature set based on the correlated plurality of parameters, and processing the feature set using a successively ordered classifier chain (SOCC) module to identify the presence of the plurality of workloads in the heterogenous environment.

Embodiments herein provide a computing device for identifying presence of a plurality of workloads in a heterogenous environment, wherein the computing device comprises a memory and a processor coupled to the memory. The processor is configured to collect a plurality of parameters from at least one layer of a system stack associated with the plurality of workloads, correlate the collected plurality of parameters, create a feature set based on the correlated plurality of parameters, and process the feature set using a successively ordered classifier chain (SOCC) module to identify the presence of the plurality of workloads in the heterogenous environment.

Embodiments herein provide methods and systems for training, by a computing device, a successively ordered classifier chain (SOCC) module that identifies a presence of a plurality of workloads in a heterogenous environment. The method includes creating a dataset with 'M' number of labels and 'N' number of features, wherein the 'M' number of labels corresponds to 'M' number of workloads; forming 'M' number of classifier modules that correspond to the 'M' number of labels with the 'N' number of features as input features and enabling the 'M' number of classifier modules to identify the presence of the respective 'M' number of labels; analyzing an accuracy of each of the 'M' number of classifier modules; selecting a classifier module from the 'M' number of classifier modules that has a highest accuracy, wherein a label identified by the selected classifier module is a first label in a chain; and recursively performing steps of: selecting a number of labels by discarding the label identified by the selected classifier module in a previous step; forming a number of classifier modules that correspond to the selected number of labels with the 'N' number of features and the label identified by the selected classifier module in the previous step as the input features and enabling the formed number of classifier modules to identify the presence of the respective number of labels; and selecting a classifier module from the formed number of classifier modules that has the highest accuracy, wherein the selected classifier module is a subsequent label in the chain, until classifier modules are selected for all the 'M' labels or until an accuracy difference of the number of classifier modules is negligible.

BRIEF DESCRIPTION OF FIGURES

FIG. 6 is a table that depicts an exemplary feature set, according to embodiments.

DETAILED DESCRIPTION

Figure 1:
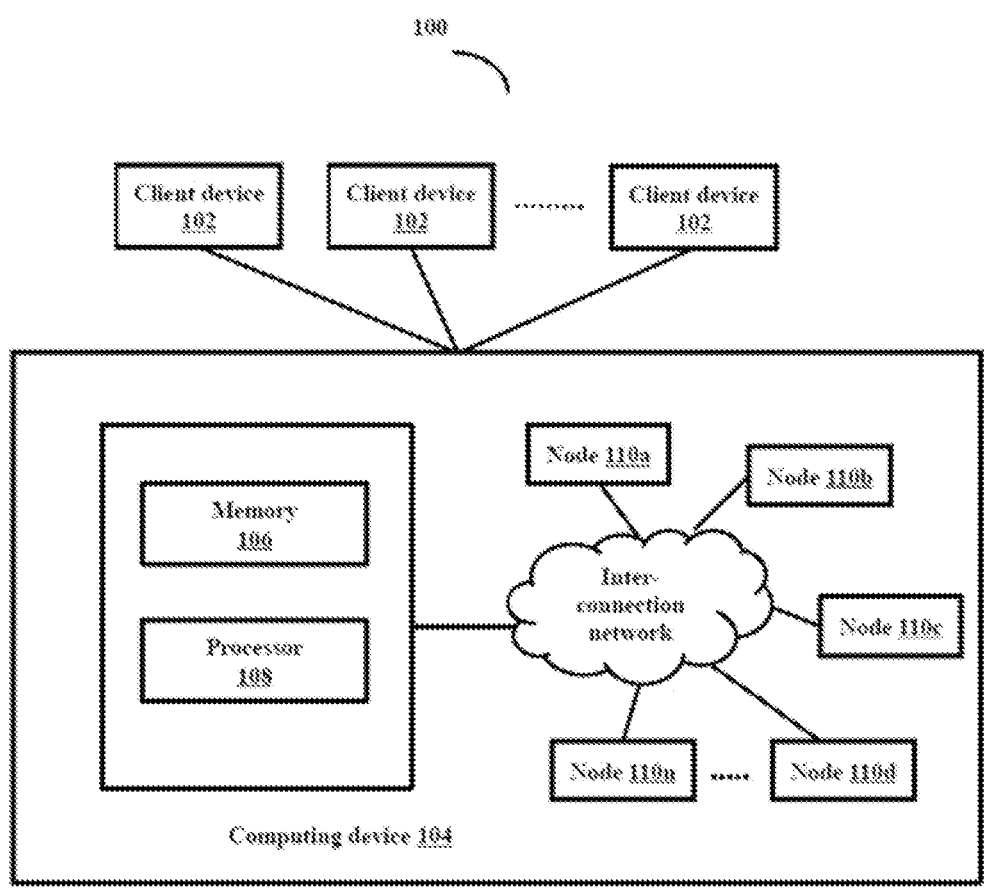
FIG. 1 depicts a heterogenous environment, according to embodiments.

Embodiments herein and the various features detailed thereof are explained more fully with reference to embodiments that are illustrated in the accompanying drawings and detailed in the following description.

Embodiments herein disclose methods and systems for identifying multiple workloads in a heterogenous environment.

Referring now to the drawings, and more particularly to FIGS. 1 through 8, where similar reference characters may denote corresponding features throughout the figures, there are shown exemplary embodiments.

FIG. 1 depicts a heterogenous environment 100, according to embodiments disclosed herein. The heterogenous environment 100 includes at least one of a data centre (DC) environment, a multi-tenancy system, a virtual machine (VM) based system, a distributed computing system, or a big data system, etc. The heterogeneous environment 100 includes a plurality of client devices 102a-102n, and a computing device 104.

The plurality of client devices 102a-102n are used by a user/client and can interface with the computing device 104 through a communication network. Examples of the client devices 102a-102n include, but are not limited to, a mobile phone, a smartphone, a tablet, a phablet, a personal digital assistant (PDA), a laptop, a computer, an electronic reader, an IoT (Internet of Things) device, a wearable computing device, a medical device, a gaming device, or any other device that can interact with the computing device 104 through a communication network. Examples of a communication network include, but are not limited to, a wired network, such as a local area network (LAN), an Ethernet, etc., or a wireless network, such as a Wi-Fi network, a cellular network, a Wi-Fi Hotspot, Bluetooth, Zigbee, etc. The client device 102 interfaces with the computing device 104 to access data such as, but not limited to, media, such as text, video, audio, images, etc., data/data files, event logs, sensor data, network data, or enterprise data, etc.

The computing device 104 includes at least one of, but is not limited to, a computer, a cloud computing device, a virtual machine (VM) instance, a DC, a server, or a network device, etc. For example, the cloud computing device is a part of a public cloud or a private cloud. For example, the server is at least one of a standalone server or a server on a cloud, etc. Examples of a server include, but are not limited to, a web server, an application server, a database server, an email-hosting server, etc. Examples of a network device include, but are not limited to, a router, a switch, a hub, a bridge, a load balancer, a security gateway, a firewall, etc.

The computing device 104 includes a memory 106, a processor 108, and a plurality of nodes 110a-110n. The computing device 104 also includes one or more of a display, an input/output interface, a controller, etc. The computing device 104 also communicates with external devices such as, but not limited to, other hosts/computing devices, external servers, external databases, networks, etc., using the communication network. Embodiments herein use terms such as "computing device", "computing entity", "host", etc., interchangeably to refer to a device that hosts the plurality of nodes 110a-110n.

Figure 2:
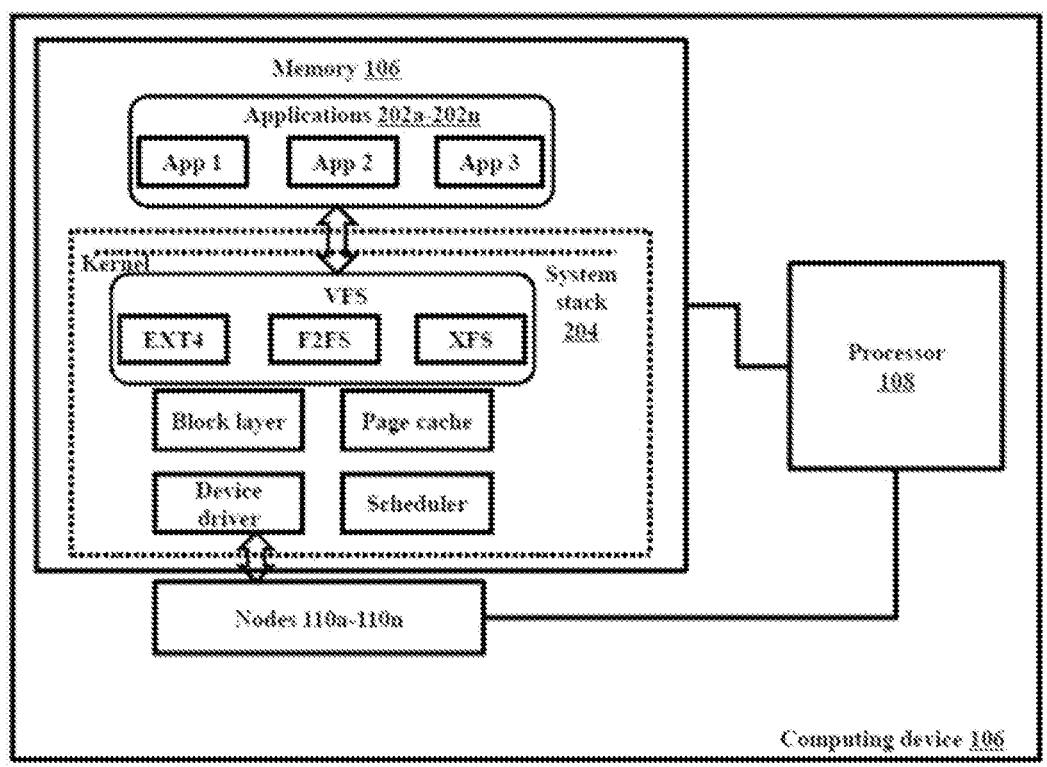
FIG. 2 is a block diagram of a datacenter environment that identifies workloads in a heterogenous environment, according to embodiments.

The memory 106 stores at least one of one or more applications 202a-202n, a system stack 204, etc., that are depicted in FIG. 2. The one or more applications 202a-202n, and the system stack 204 are described in detail with reference to FIG. 2. Examples of the memory 106 include, but are not limited to, a NAND, an embedded Multimedia Card (eMMC), a Secure Digital (SD) card, a Universal Serial Bus (USB), a Serial Advanced Technology Attachment (SATA), a solid-state drive (SSD), a data server, a file storage server, etc. The memory 106 may also include one or more computer-readable storage media. The memory 106 may also include non-volatile storage elements. Examples of a non-volatile storage element include a magnetic hard disc, an optical disc, a floppy disc, a flash memory, or an electrically programmable memory (EPROM) or an electrically erasable and programmable (EEPROM) memory. In addition, the memory 106 may, in some examples, be considered a non-transitory storage medium. The term "non-transitory" indicates that the storage medium is not embodied in a carrier wave or a propagated signal. However, the term "non-transitory" does not mean that the memory 106 is non-movable. In some embodiments, a non-transitory storage medium stores data that can, over time, change, such as a random access memory (RAM) or cache.

The processor/controller 108 includes at least one of a single processer, a plurality of processors, multiple homogeneous or heterogeneous cores, multiple Central Processing Units (CPUs) of different kinds, microcontrollers, special media, or other accelerators. In addition, the processor 108 may also include at least one of a datacenter controller, a fabric controller, or any other suitable type of controller.

The processor 108 can add/remove the nodes 110a-110n to/from the computing device 104. The processor 108 can also distribute workloads to the one or more nodes 110a-110n. The workloads may refer to a flow of IO commands that a node is subjected to. The processor 108 also allocates resources to the one or more nodes 110a-110n for executing the workloads. Examples of the resources include, but are not limited to, computing resources, such as a central processing unit (CPU), a processor, etc., data storage, network resources, random access memory (RAM), disk space, input/output operations, etc.

The plurality of nodes 110a-110n are instance groups that can execute the workloads. Examples of the plurality of nodes 110a-110n include, but are not limited to, VMs, I/O nodes, storage nodes, computing nodes, etc. For example, the storage nodes include at least one of a hard disk drive (HDD), a solid-state drive, a persistent memory (PMEM), a NAND memory device, or any other similar memory node. Examples of the computing nodes include, but are not limited to, a CPU, a Graphical Processing Unit (GPU), etc. For example, the plurality of nodes 110a-110n are interconnected with each other through a communication network. For example, the plurality of nodes 110a-110n are not interconnected with each other.

The computing device 104 can identity a plurality of workloads at a time. In an embodiment, identifying the plurality of workloads means identifying a presence of the plurality of workloads and the associated signatures.

In an embodiment, the computing device 104 identifies the presence of a plurality of workloads using a successively ordered classifier chain (SOCC) module/model 302. Identifying the presence of the plurality of workloads is described in detail with reference to FIGS. 2, and 3.

The computing device 104 can identify the presence of the plurality of workloads for:

InputOutput (IO) distribution: the identification of the plurality of workloads helps in correctly distributing the IO among the nodes 110a-110n, such as the storage nodes). The identification of the signatures of the workloads aids existing distribution methods that efficiently distribute the I/O among the storage nodes. In addition, the identification of the workloads yields knowledge about the upcoming IOs so that the distribution methods can distribute the related IOs to more efficiently retrieve the IOs;

placement of the data in cache tiers: the heterogenous environment 200 can deploy tiering of fast and slow nodes 110a-110n, thus the identification of the signatures of the workloads helps place the data among the tiers; and tiered replication.

FIG. 1 illustrates an exemplary heterogenous environment 100, but embodiments are not necessarily limited thereon. In other embodiments, the heterogenous environment 100 includes fewer or more blocks. Further, the labels or names of the blocks are used for illustrative purpose and do not limit the scope of the embodiments herein. In an embodiment, one or more blocks can be combined together to perform the same or substantially similar functions in the heterogenous environment 100.

FIG. 2 depicts components of nodes in a datacenter environment that identifies workloads in a heterogenous environment, according to embodiments. The computing device 104 includes the memory 106, the processor 108, and the plurality of nodes 110a-110n.

The memory 106 includes the one or more applications 202a-220n and the system stack 204. Examples of the applications 202a-220n include, but are not limited to, an enterprise application, a data storage application, a media processing application, an email application, a sensor related application, etc. The system stack 204 includes a collection of independent components/layers that support the execution of the one or more applications 202a-202n. An exemplary system stack 204 is depicted in FIG. 2. As depicted in FIG. 2, the system stack 204 includes a kernel that includes a virtual file system (VFS), and a plurality of layers associated with the plurality of workloads. The VFS allows the client devices 102a-102n to access different types of concrete file systems in a uniform way. For example, the VFS can interface with at least one of an ext4 (fourth extended file system) file system, a flash-friendly file system (F2FS), an XFS file system, etc. For example, the plurality of layers includes at least one of a block layer, a page cache, a device driver layer, a journal, a scheduler, a file system layer, a file system to a device driver interface layer, etc.

The processor 108 can identify the plurality of workloads in a heterogenous environment.

To identify the plurality of workloads, the processor 108 collects a plurality of parameters from the one or more layers of the system stack associated with the plurality of workloads. Examples of the parameters from a file system layer include a file descriptor, a file offset, etc. Examples of the parameters collected while a file system is issuing requests to the below layer include a block device on which the request goes to, a block number, a number of blocks, etc., after the file system has processed and translated the first set of parameters to this set of parameters. Examples of the parameters collected from the below layer of file systems, which may be a block driver layer, while decoding the requests from the file system layer include a block number, a number of blocks, or any layer specific parameter, etc. To collect the plurality of parameters, the processor 108 selects the plurality of parameters from a set of parameters associated with the one or more layers of the system stack 204. The processor 108 collects the selected plurality of parameters from the respective one or more layers of the system stack 204. In an embodiment, the processor 108 periodically collects the selected plurality of parameters from the one or more layers of the system stack 204. Thus, periodically collecting the selective parameters controls an overhead by adding an identifiable latency.

The processor 108 correlates the collected plurality of parameters by choosing key transition points and key arguments associated with each layer of the system stack 204. Examples of key transitions points include that of a file system translating a (file descriptor, offset) tuple to a (block device, block number) tuple. In addition, the caching layer translates a (file descriptor, offset) tuple to a (DRAM buffer address, number of buffers) tuple, etc.

The processor 108 creates a feature set based on the correlated plurality of parameters. The feature set serves as a signature for each workload. Examples of the feature set include, but are not limited to, a number of overwrites, a read-copy update (RCU), warmness of data, a continuous point, a break point, an average segment length, a standard deviation of a block address, a continued to break point ratio, and an average block size of IOs. For example, the number of overwrites indicates a number of writes in a given range of a unit of data, and the warmness of data indicates that the data is recently written or accessed. Examples of the feature set are described in an example table of FIG. 6.

To create a feature set, the processor 108 obtains a data point of a trace event from one of the lower layers of the system 204. The data point depends upon the layer of the system stack 204 from which the parameters have been collected and correlated. For example, the data point includes a file name, a file offset, and an operation type, if the layer is the file system layer. For example, if the layer is the file system to the device driver interface layer, the data point includes a file name, a file offset, an operation type, a block address, and a number of blocks. The processor 108 correlates the obtained data point to data points of trace events collected in the upper layers of the system stack 204. The processor 108 recursively performs steps of comparing spatial and temporal locality of the trace events of the different upper layers and adding the trace events to the feature set, until all the trace events of all the layers have been collected and compared. Herein, the lower layers and the upper layers are the layers of the system stack 204 from which the parameters have been collected and correlated. Creating the feature set, including the number of overwrites and the warmness of data, is described in detail with reference to FIG. 5. The processor 108 stores the collected and correlated parameters and the feature set in the memory 106.

Once the feature set has been created, the processor 108 processes the feature set using the SOCC module 302 to identify the presence of the plurality of workloads in the heterogenous environment.

Figure 3:
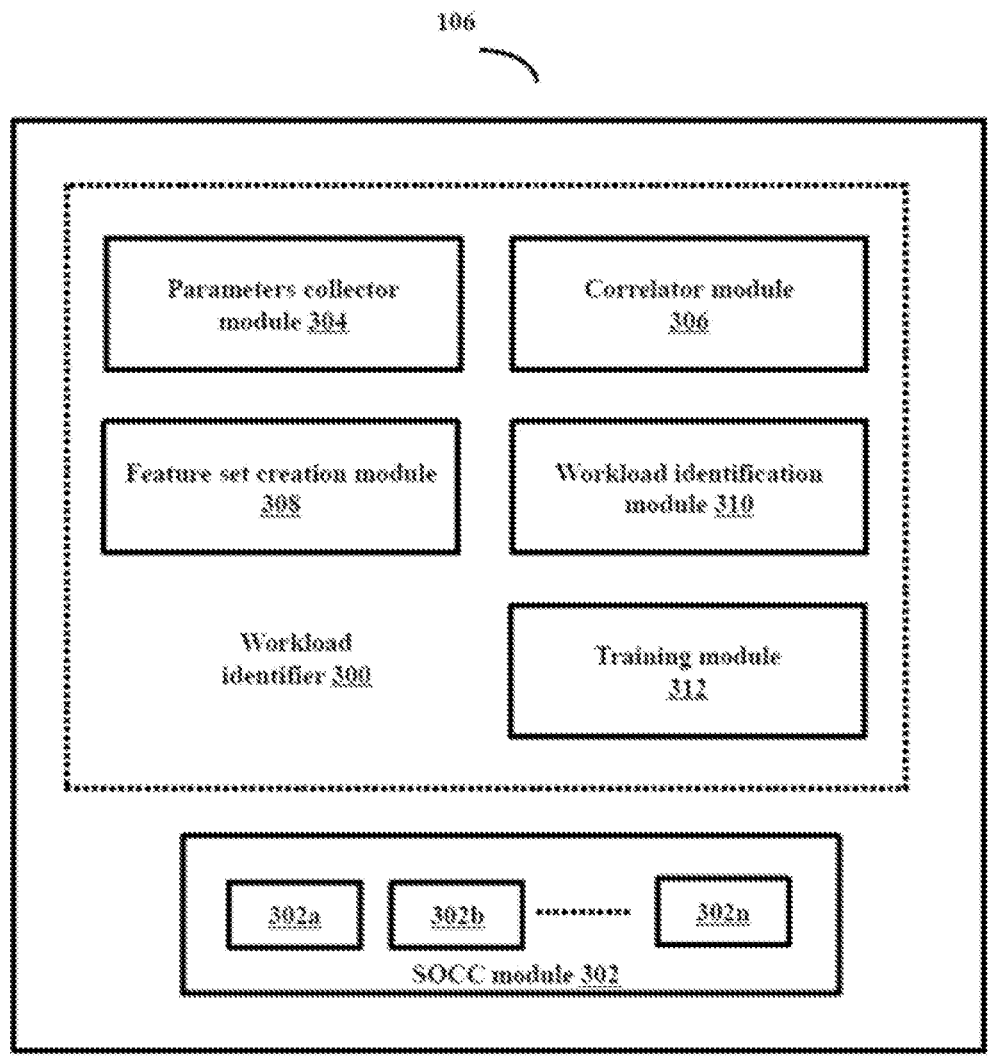
FIG. 3 depicts a workload identifier that is executed by the computing device to identify a plurality of workloads in a heterogenous environment, according to embodiments.

The SOCC module 302 is stored in the memory 106, as depicted in FIG. 3, and is executed by the processor 108 to identify the presence of the plurality of the workloads based on the feature set. In an embodiment, the SOOC module 302 is a classifier chain that is based on classification and regression trees. In an embodiment, the SOCC module 302 is replaced by other modules, such as, but not limited to, an artificial intelligence (AI) model, a multi-class support vector machine (SVM) model, a machine learning (ML) module, a convolutional neural network (CNN) model, a deep neural network (DNN), a recurrent neural network (RNN), a restricted Boltzmann machine (RBM), a deep belief network (DBN), a bidirectional recurrent deep neural network (BRDNN), a generative adversarial network (GAN), a regression based neural network, a deep reinforcement model (with ReLU activation), a deep Q-network, etc. The SOCC module 302 includes a plurality of classifier modules 302a-302n. Each classifier module is a binary classification module that can identify the presence or absence of the plurality of workloads. Embodiments herein use the terms such as "classifier modules", "binary classifier modules", "classifiers", etc., interchangeably through the document. In an example, the number of classifier modules 302a-302n in the SOCC module 302 depends on the feature set and the number of workloads.

In an embodiment, the processor 108 trains the SOCC module 302 by forming the plurality of classifier modules 302a-302n in a successively ordered chain.

To train the SOCC module 302, the processor 108 creates a dataset with 'M' number of labels and 'N' number of features. The 'M' number of labels corresponds to 'M' number of workloads. The processor 108 then forms 'M' number of classifier modules that correspond to the 'M' number of labels with the 'N' number of features as input features and enables the 'M' number of classifier modules to identity the presence of the respective 'M' number of labels. The processor 108 analyzes an accuracy of each of the 'M' number of classifier modules. The processor 108 selects a classifier module from the 'M' number of classifier modules that has the highest accuracy. The processor 108 considers a label of the 'M' number of labels identified by the selected classifier module as a first label. The label corresponds to the workload.

On selecting the label after analyzing the accuracy of each of the 'M' number of classifier modules, the processor 108 recursively performs the following steps until the classifier module is selected for all the 'M' labels or until a difference in accuracy of the number of classifier modules is negligible:
  selecting a number of labels by discarding the label identified by the selected classifier module in the previous step;
  forming a number of classifier modules that correspond to the selected number of labels with the 'N' number of features and the label identified by the selected classifier module in the previous step as the input features and enabling the formed number of classifier modules to identify the presence of the respective number of labels; and
  selecting a classifier module from the formed number of classifier modules that has the highest accuracy, wherein the selected classifier module is a subsequent label in the chain.

Thus, the trained SOCC module 302a forms the appropriate correlation between the different labels/workloads that can enhance the accuracy of identifying the workloads in the heterogenous environment 100, which further leads to resource and performance optimizations. The trained SOCC module 302 includes the plurality of classifier modules 302a-302n. Each classifier module (302a-302n) of the trained SOCC module 302 can solve an independent binary classification task.

A function associated with the training method of the SOCC module 302 can be performed using the non-volatile memory, the volatile memory, and the processor 108. The processor 108 may include one or more processors that train the SOCC module 302 and execute/process the SOCC module 302. One or more processors may be a general purpose processor, such as a central processing unit (CPU), an application processor (AP), etc., a graphics-only processing unit such as a graphics processing unit (GPU), a visual processing unit (VPU), and/or a dedicated artificial intelligence (AI) processor such as a neural processing unit (NPU).

Being provided through learning means that, by applying the training method to the dataset, a predefined operating rule or the SOCC module 302 of a desired characteristic is made. Functions of the SOCC module 302 can be performed in the computing device 104 itself in which the training according to an embodiment is performed, and/or can be implemented through a separate server/system.

The processor 108 uses the trained SOCC module 302 to identify the presence of the plurality of workloads based on the feature set.

FIG. 3 depicts a workload identifier 300 that is executed by the computing device 104 to identify the plurality of workloads in the heterogenous environment 100, according to embodiments as disclosed herein. The workload identifier 300 is stored in the memory 106 and processed/executed by the processor 108 to identify the presence and signature of the plurality of workloads. In an embodiment, the feature set created by collecting and correlating the parameters of the layers of the system stack 204 serves as the signature of each of the workloads.

The workload identifier 300 includes a parameters collector module 304, a correlator module 306, a feature set creation module 308, a workload identification module 310, and a training module 312.

The parameter collector module 304 periodically selectively collects the parameters from the one or more layers of the system stack 204.

The correlator module 306 correlates the collected parameters. The correlator module 306 correlates the collected parameters by choosing the key transition points and the key arguments in each layer of the system stack 204.

The feature set creation module 308 creates the feature set based on the correlated parameters. To create the feature set, the feature set creation module 308 collects the data points of the trace event from one of the lower layers of the system stack 204 from which the parameters have been collected. The feature set creation module 308 correlates the obtained data points to the data points of the trace events collected in the upper layers. The feature set creation module 308 recursively compares the spatial and temporal locality of the trace events of the different upper layers and adds the trace events to the feature set, until the feature set has been created, based on the data points of all the layers of the system stack 204 from which the parameters have been collected and correlated.

The workload identification module 310 provides the created feature set to the trained SOCC module 302, which identifies the presence of the plurality of workloads using the plurality of binary classifier modules 302a-302n.

The training module 312 trains the SOCC module 302 by building the plurality of binary classification modules 302a-302n in the successively ordered chain.

FIGS. 2 and 3 show exemplary blocks of the computing device 104, but embodiments are necessarily not limited thereto. In other embodiments, the computing device 104 includes fewer or more blocks. Further, the labels or names of the blocks are used for illustrative purpose and do not limit the scope of the embodiments herein. In an embodiment, one or more blocks can be combined together to perform same or substantially similar functions in the computing device 104.

Figure 4:
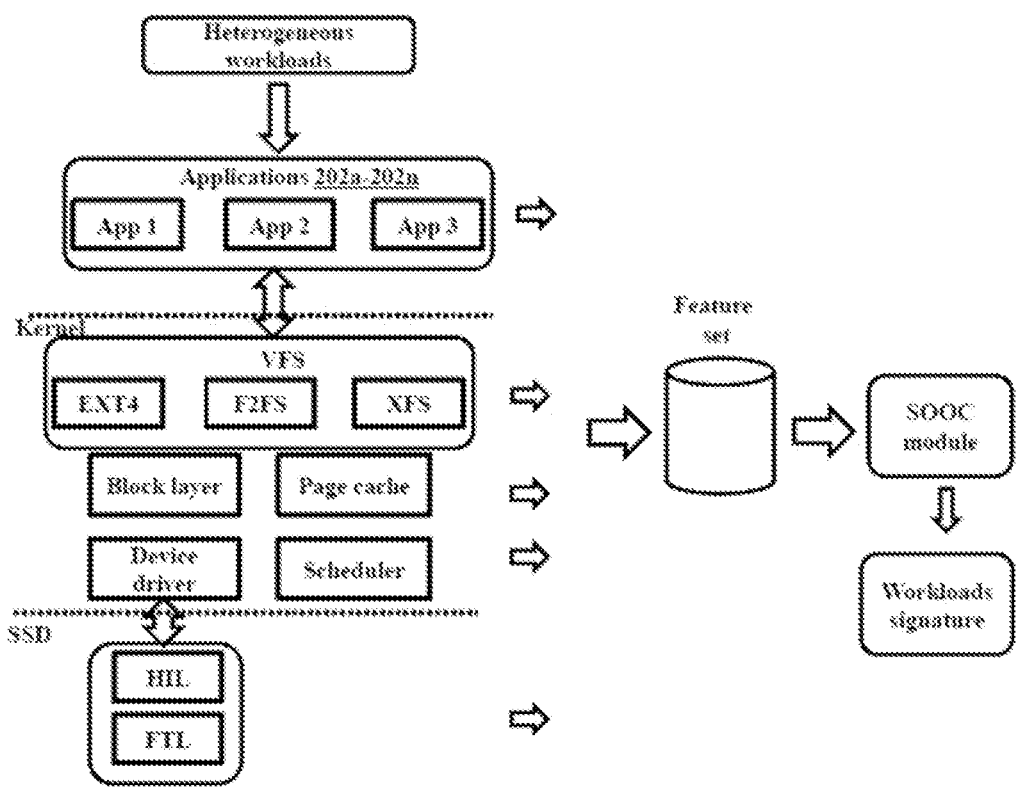
FIG. 4 depicts the identification of a plurality of workloads, according to embodiments.

FIG. 4 depicts the identification of the plurality of workloads, according to embodiments. FIG. 4 (and FIG. 5, described below) shows a solid state drive SSD in signal communication with the kernel. The solid state drive SSD includes a host interface layer HTL that interfaces to the host and performs data transport protocol conversion, and a flash translation layer FTL that manages the flash chips of the solid state drive SSD.

As depicted in FIG. 4, in an embodiment, the computing device 104 selectively collects the plurality of parameters from the one or more layers of the system stack 204 associated with the plurality of workloads. The computing device 104 correlates the collected plurality of parameters and creates the feature list based on the correlated plurality of parameters. The feature list serves as the signature of the plurality of workloads. The computing device 104 processes the feature list using the SOCC module 302 to identify the presence of the plurality of workloads. Thus, logging possible variations/parameters of each workload and combination of the workloads and using the SOCC module 302 provides an ability to distinguish and identify the presence of the multiple workloads.

Figure 5:
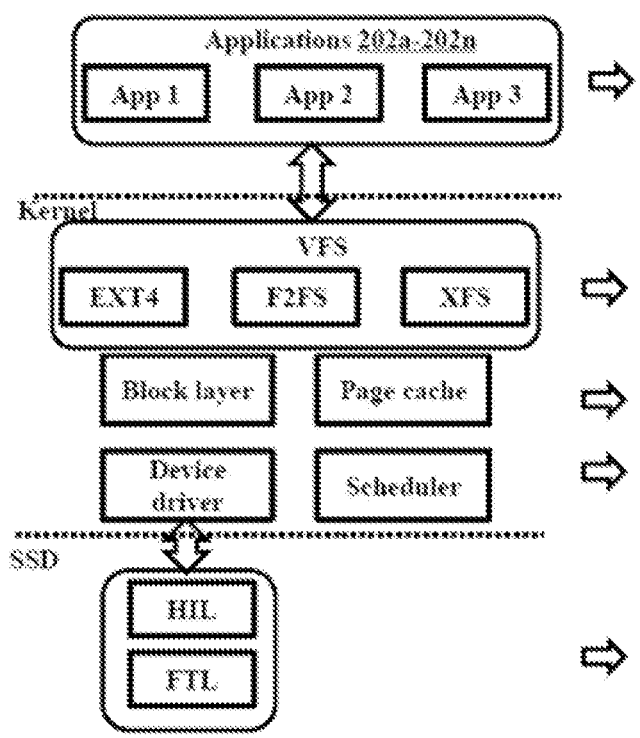
FIG. 5 depicts creation of a feature set, according to embodiments.

FIG. 5 depicts creation of the feature set, according to embodiments. The feature set/feature tuple serves as the signature for each workload. Examples of the feature set are depicted in a table of FIG. 6. In FIG. 6, "cp2 bp" refers to a continuous point to break point ratio.

Embodiments herein describe the creation of the feature list such as the number of overwrites, and the warmness of data, as examples, but other feature lists can be similarly created.

To create the number of overwrites, the computing device 104 obtains a block number from a lower layer. For example, the lower layer may be, but is not necessarily limited to, the device driver layer. The computing device 104 checks if the obtained block number or a block near to the obtained block number has been recently accessed by checking recent trace events in the same lower layer. If the obtained block number or the block near to the obtained block number has been recently accessed, the computing device 104 adds the obtained block number to the feature set. If the obtained block number or the block near to the obtained block number has not been recently accessed, the computing device 104 checks the upper layer subsequent to the lower layer for the trace event. For example, the subsequent upper layer includes the file system layer. The computing device 104 adds the trace event that corresponds to the subsequent upper layer to the feature set, if the upper layer has the trace event. If the file system does not have the trace event, the computing device 104 checks the upper layers subsequent and that correspond to the file system layer for the trace event to add in the feature set. The computing device 104 performs the above described steps recursively/repeatedly, until all the layers have been checked, to create the feature list.

To determine the warmness of data, the computing device 104 checks a warmness in the lower layer. If the warmness is negative in the lower layer, the computing device 104 recursively performs the following steps until the feature set is created by checking all layers from which the parameters have been collected:

- checking the warmness in upper layers that are subsequent and correspond to the lowest layer or a previous layer, until detecting that the warmness is positive in one of the subsequent upper layers in the given same range;
- calculating a warmness factor based on the checked warmness in the lower layer or the subsequent upper layers; and
- creating the feature set based on the calculated warmness factor.

Figure 7:
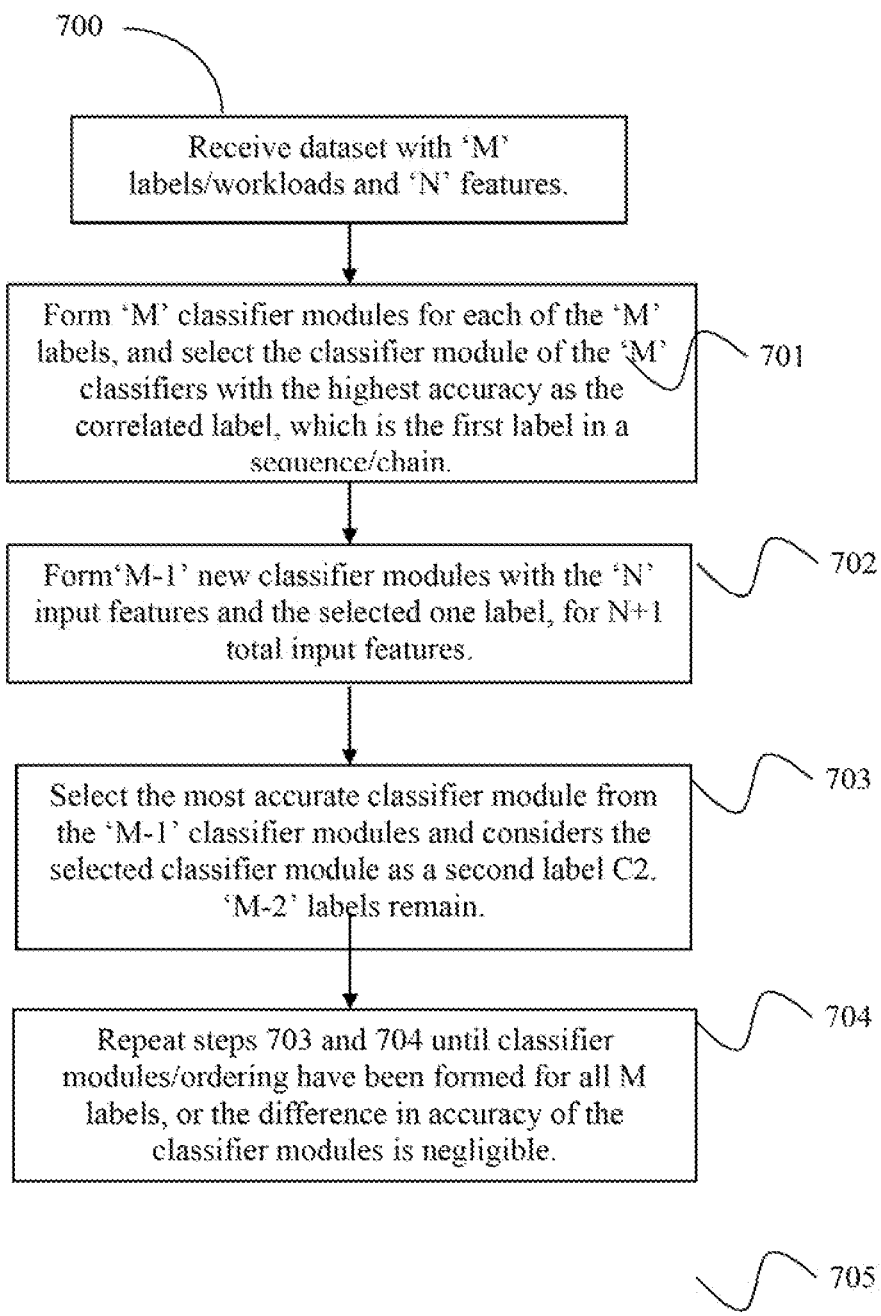
FIG. 7 is a flowchart of a method of training a Successively Ordered Classifier Chain (SOCC) module, according to embodiments.

FIG. 7 is a flowchart 700 of a method of training the SOCC module 302, according to embodiments. In an embodiment, the labels/workloads are correlated with each other while training the SOCC module 302. Thus, different label orderings while training the SOCC module 302 can cause different accuracies.

In an embodiment, at step 701, the computing device 104 receives the dataset with 'M' labels/workloads and 'N' features for training the SOCC module 302. At step 702, the computing device 104 first forms 'M' classifier modules for each of the 'M' labels, wherein the 'N' features are the only inputs. The computing device 104 selects the classifier module of the 'M' classifiers with the highest accuracy as the correlated label, which is a first label C1 in a sequence/chain. At step 703, on selecting the first label, the computing device 104 forms 'M−1' new classifier modules with the input features as the 'N' features and the selected one label, for N+1 total input features. At step 704, the computing device 104 selects the most accurate classifier module from the 'M−1' classifier modules and considers the selected classifier module as a second label C2. At step 705, the computing device 104 repeats steps 703 and 704 until classifier modules/ordering have been formed for all M labels, or the difference in accuracy of the classifier modules is negligible. The classifier modules C1, C2, . . . , CM are binary classification modules.

The final SOCC module 302 generated/trained through the successively order chain ensures the correlation of the labels and guarantees that the SOCC module 302 learns how the presence of the certain workloads relates to the presence of the other workloads. In addition, in some specific cases, the training of the SOCC module 302 is repeated for all the labels/workloads. In such a case, the number of classifier modules created for the SOCC module 302 may be represented as:

$$M + M-1 + M-2 + \ldots + 2 = \frac{(M*(M+1))}{2} - 1.$$

The above representation indicates that a large number of classifier modules are built in total. However, the number of classifier modules is less than a power set of 'M' which is $2^M$. Thus, the training of the SOCC module 302a is less computationally intensive compared to existing methods used for training multi-label classifier modules/models.

Consider a scenario example in which the computing device 104 creates a dataset that includes 10 workloads/labels and 15 features. In such a scenario, the computing device 104 builds 10 binary classification modules for each of the 10 workloads, in which the 10 binary classification modules outputs the 10 workloads/10 labels based on the 15 features. The computing device 104 analyzes the accuracy of the 10 binary classification modules and selects the binary classification module (C1) with the highest accuracy in identifying the label/workload compared to others.

On selecting the binary classification module C1, the computing device 104 builds 9 binary classification modules for each of 9 workloads based on the 15 features and the selected binary classification module C1. The computing device 104 analyzes the accuracy of the 9 binary classification modules and selects the binary classification module (C2) with the highest accuracy in identifying the label/workload compared to others.

On selecting the binary classification module C2, the computing device 104 builds 8 binary classification modules for each of 8 workloads based on the 15 features and the selected binary classification module C2. The computing device 104 analyzes the accuracy of the 8 binary classification modules and selects the binary classification module (C3) with the highest accuracy in identifying the label/workload compared to others.

Similarly, the computing device 104 repeats above steps to create the classifier module for all 10 workloads/labels, or until the accuracy difference of the number of classifier modules is negligible.

For an example, consider a scenario in which the computing device 104 detects that the accuracy difference of 5 classifier modules is negligible, after creating the 5 classification modules based on the 15 features and a binary classification module C4. In such a scenario, the computing device 104 randomly creates the remaining classification modules for the remaining labels/workloads. Thus, the binary classification modules C1, C2, C3, ..., C10 for the 10 workloads/labels are obtained.

Training the SOCC module 302 according to embodiments can result in predicting causality between the workloads in the heterogenous environment 100 and correlating the workloads/labels outputted by each classifier module, referred to as output labels. The SOCC module 302 can also be trained by considering a drastic change in a behavior of the workload.

Identification of the multiple workloads should consider that the presence of some workloads may be highly correlated to the presence of some other workloads. The capability of the SOCC module 302 to form the appropriate correlation between the different labels (workloads) is a reason for using the SOCC module 302 to identity the multiple workloads.

Figure 8:
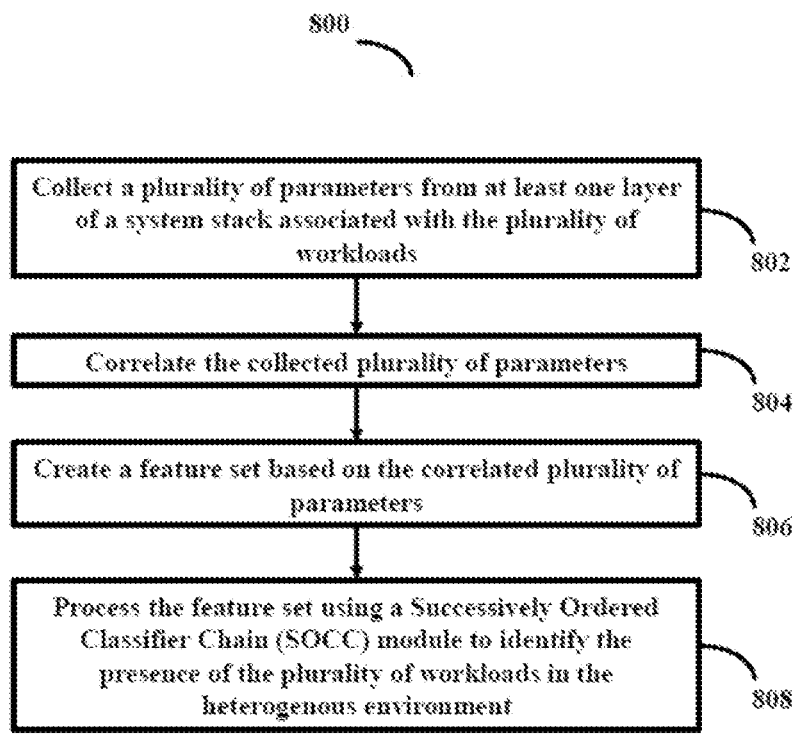
FIG. 8 is a flowchart of a method for identifying the presence of a plurality of workloads in a heterogenous environment, according to embodiments.

FIG. 8 is a flowchart 800 of a method of identifying the presence of a plurality of workloads in the heterogenous environment 100, according to embodiments.

At step 802, the method includes collecting, by the computing device 104, a plurality of parameters from at least one layer of the system stack 204 associated with the plurality of workloads. At step 804, the method includes correlating, by the computing device 104, the collected plurality of parameters. At step 806, the method includes creating, by the computing device 104, the feature set based on the correlated plurality of parameters.

At step 808, the method includes processing, by the computing device 104, the feature set using the SOCC module 302 to identify the presence of the plurality of workloads in the heterogenous environment 100. The various actions in method 800 may be performed in the order presented, in a different order or simultaneously. Further, in some embodiments, some actions listed in FIG. 8 are omitted.

Embodiments provide a framework for identifying workloads in a heterogenous environment. The framework Includes:
- a unique feature that describes a multi workload scenario, such as a warmness of a workload (not blocks), which indicates if a workload is repeatedly accessing some other blocks, thus requiring observing layers such as a cache, a journal, a block layer, etc.;
- an ability to trace features from different layers and co-relate such features, such as the warmness of the workload and read breakpoints, which involve multiple layers such as a file system (FS), a cache, a journal, or a block, and co-relating the features from such layers to create the warmness of data/workload;
- an ability to perform the features tracing without impacting a system and coloring the data, such as trigger based tracing, methods that use only deterministic ways to log, the selective enabling of traces, etc.; and
- an ability to select a SOCC/machine learning (ML) module and customizing the SOCC/ML module to identify the multiple workloads.

Embodiments provide a computing device/computing entity that deploys a technique dependent on the features being logged by tracing from different layers of a system stack and co-relating these features. The set of features is diverse enough to identify key differences in the different workloads. Inclusion of features such as a percentage of overwrites, read-copy-updates (RCUs), warmness of data, continuous points, break points, etc., help to identify differences between the different workloads. The computing entity calculates such features and provides the features to the SOCC module, which classifies the features into the different workloads. The SOCC module provides a real-time output, which in turn is the basis for decisions such as distribution decisions for distributing the workloads among the nodes, etc., in the heterogenous environment.

Embodiments of the disclosure can be implemented through at least one software program running on at least one hardware device and performing network management functions to control the elements. The elements shown in FIGS. 1, 2, and 3 can be at least one of a hardware device, or a combination of hardware device and software module.

Embodiments of the disclosure provide methods and systems for identifying the presence of multiple workloads in a heterogeneous environment. Therefore, it is understood that the scope of the protection is extended to such a program and a computer readable storage means that contains program code means that implements one or more steps of the method, when the program runs on a server or mobile device or any suitable programmable device. The method is implemented through or together with a software program written in, e.g., a very high speed integrated circuit Hardware Description Language (VHDL), another programming language, or implemented by one or more VHDL or several software modules being executed on at least one hardware device. The hardware device may be any kind of portable device that may be programmed. The device may also include hardware means, such as an ASIC, or a combination of hardware and software means, such as an ASIC and an FPGA, or at least one microprocessor and at least one memory with software modules located therein. Method embodiments of the disclosure can be implemented partly in hardware and partly in software. Alternatively, embodiments of the disclosure can be implemented on different hardware devices, e.g., using a plurality of CPUs.

The foregoing description of embodiments will enable others to, by applying current knowledge, readily modify and/or adapt for various applications such specific embodiments without departing from the generic concept, and, therefore, such adaptations and modifications should and are intended to be comprehended within the meaning and range of equivalents of embodiments. It is to be understood that the phraseology or terminology employed herein is for the purpose of description and not of limitation. Therefore, those skilled in the art will recognize that embodiments of the disclosure can be practiced with modification within the spirit and scope of the following claims.

What is claimed is:

1. A method for identifying a plurality of workloads in a heterogenous environment, the method comprising:
   collecting, by a computing device, a plurality of parameters from at least one layer of a system stack associated with the plurality of workloads;
   correlating, by the computing device, the collected plurality of parameters;
   creating, by the computing device, a feature set based on the correlated plurality of parameters;
   processing, by the computing device, the feature set using a successively ordered classifier chain (SOCC) module wherein presence of the plurality of workloads in the heterogenous environment is identified,
   training, by the computing device, the SOCC module by forming a plurality of classifier modules in a successively ordered chain,
   wherein the training the SOCC module comprises:
   creating a dataset with 'M' number of labels and 'N' number of features, wherein the 'M' number of labels corresponds to 'M' number of workloads, and wherein the 'M' and the 'N' are integers;

forming 'M' number of classifier modules that correspond to the 'M' number of labels with the 'N' number of features as input features and enabling the 'M' number of classifier modules to identify presence of each of the 'M' number of labels;

analyzing an accuracy of each of the 'M' number of classifier modules;

selecting a classifier module that has a highest accuracy from the 'M' number of classifier modules, wherein a label identified by the selected classifier module is a first label in a chain; and recursively performing steps of:
  selecting a number of labels by discarding the label identified by the selected classifier module in a previous step;
  forming a number of classifier modules that correspond to the selected number of labels with the 'N' number of features and the label identified by the selected classifier module in the previous step as the input features and enabling the formed number of classifier modules to identify presence of each of the number of labels; and
  selecting a classifier module from the formed number of classifier modules that has the highest accuracy, wherein the selected classifier module is a subsequent label in the chain,
until classifier modules are selected for all the 'M' number of labels.

2. The method of claim 1, wherein the collecting, by the computing device, of the plurality of parameters includes:
  selecting the plurality of parameters from a set of parameters associated with the at least one layer of the system stack; and
  periodically collecting the plurality of parameters from the at least one layer of the system stack.

3. The method of claim 1, wherein the correlating, by the computing device, of the collected plurality of parameters includes:
  correlating the plurality of parameters by choosing key transition points and key arguments in each layer of the system stack.

4. The method of claim 1, wherein the feature set serves as a signature for each workload.

5. The method of claim 4, wherein the feature set includes at least one of a number of overwrites, read-copy updates (RCUs), a warmness of data, continuous points, break points, an average segment length, a standard deviation of a block address, a continued to break point ratio, and an average block size of InputOutputs (IOs), wherein the number of overwrites indicates a number of writes in a given range of a unit of data, and the warmness of data indicates that the data has been recently written or accessed.

6. The method of claim 4, wherein the creating of the feature set includes:
  obtaining a data point of a trace event from a lower layer that is lower than the at least one layer in the system stack, wherein the data point includes a block address, a number of blocks, and an operation type, if the lower layer is a device driver layer, wherein the data point includes a file name, a file offset and an operation type, if the lower layer is a file system layer, wherein the data point includes a file name, a file offset, an operation type, a block address and a number of blocks, if the lower layer is a file system to a device driver interface layer;
  co-relating the obtained data point to data points of trace events collected in at least one of upper layers that are above the lower layer in the system stack; and
  recursively comparing spatial and temporal locality of the trace events of the upper layers and adding the trace events to the feature set until the feature set is created by comparing all the upper layers.

7. A computing device, comprising:
a memory; and
a processor coupled to the memory, wherein the processor is configured to:
  collect a plurality of parameters from at least one layer of a system stack associated with a plurality of workloads;
  correlate the collected plurality of parameters;
  create a feature set based on the correlated plurality of parameters;
  process the feature set using a successively ordered classifier chain (SOCC) module wherein presence of the plurality of workloads in a heterogenous environment is identified,
  train the SOCC module by forming a plurality of classifier modules in a successively ordered chain,
wherein the processor is configured to:
  create a dataset with 'M' number of labels and 'N' number of features, wherein the 'M' number of labels corresponds to 'M' number of workloads, and wherein the 'M' and the 'N' are integers;
  form 'M' number of classifier modules that correspond to the 'M' number of labels with the 'N' number of features as input features and enabling the 'M' number of classifier modules to identify presence of each of the 'M' number of labels;
  analyze an accuracy of each of the 'M' number of classifier modules;
  select a classifier module that has a highest accuracy from the 'M' number of classifier modules, wherein a label identified by the selected classifier module is a first label in a chain; and
  recursively perform steps of:
    selecting a number of labels by discarding the label identified by the selected classifier module in a previous step;
    forming a number of classifier modules that correspond to the selected number of labels with the 'N' number of features and the label identified by the selected classifier module in the previous step as the input features and enabling the formed number of classifier modules to identify presence of each of the number of labels; and
    selecting a classifier module from the formed number of classifier modules that has the highest accuracy, wherein the selected classifier module is a subsequent label in the chain,
  until classifier modules are selected for all the 'M' number of labels.

8. The computing device of claim 7, wherein the processor is configured to:
  select the plurality of parameters from a set of parameters associated with the at least one layer of the system stack; and
  periodically collect the plurality of parameters from the at least one layer of the system stack.

9. The computing device of claim 7, wherein the processor is configured to:
  correlate the plurality of parameters by choosing key transition points and key arguments in each layer of the system stack.

10. The computing device of claim 7, wherein the feature set serves as a signature for each workload.

11. The computing device of claim 10, wherein the feature set includes at least one of a percentage of overwrites, read-copy updates (RCUs), a warmness of data, continuous points, break points, an average segment length, a standard deviation of block address, a continued to break point ratio, and an average block size of InputOutputs (IOs), wherein the number of overwrites indicates a number of writes in a given range of a unit of data, and the warmness of data indicates that the data has been recently written or accessed.

12. The computing device of claim 10, wherein the processor is configured to:
obtain a data point of a trace event from a lower layer that is lower than the at least one layer in the system stack, wherein the data point includes a block address, a number of blocks, and an operation type, if the lower layer is a device driver layer, wherein the data point includes a file name, a file offset and an operation type, if the lower layer is a file system layer, wherein the data point includes a file name, a file offset, an operation type, a block address and a number of blocks, if the lower layer is a file system to a device driver interface layer;
co-relate the obtained data point to data points of trace events collected in at least one upper layers that are above the lower layer in the system stack; and
recursively compare spatial and temporal locality of the trace events of the upper layers and co-relate, and add the trace events to the feature set, until the feature set is created by comparing all the upper layers.

13. A method of training, by a computing device, a successively ordered classifier chain (SOCC) module that identifies presence of a plurality of workloads in a heterogenous environment, the method comprising:
creating a dataset with 'M' number of labels and 'N' number of features, wherein the 'M' number of labels corresponds to 'M' number of workloads and wherein the 'M' and the 'N' are integers;
forming 'M' number of classifier modules that correspond to the 'M' number of labels with the 'N' number of features as input features and enabling the 'M' number of classifier modules to identify presence of each of the 'M' number of labels;
analyzing an accuracy of each of the 'M' number of classifier modules;
selecting a classifier module that has a highest accuracy from the 'M' number of classifier modules, wherein a label identified by the selected classifier module is a first label in a chain; and recursively performing steps of: selecting a number of labels by discarding the label identified by the selected classifier module in a previous step;
forming a number of classifier modules that correspond to the selected number of labels with the 'N' number of features and the label identified by the selected classifier module in the previous step as the input features and enabling the formed number of classifier modules to identify presence of each of the number of labels; and
selecting a classifier module from the formed number of classifier modules that has the highest accuracy, wherein the selected classifier module is a subsequent label in the chain, until classifier modules are selected for all the 'M' number of labels.

* * * * *